Dec. 3, 1963     A. A. LACHANCE ETAL     3,112,832
AUTOMATICALLY ACTUATED GROCERY CART
Filed May 26, 1960
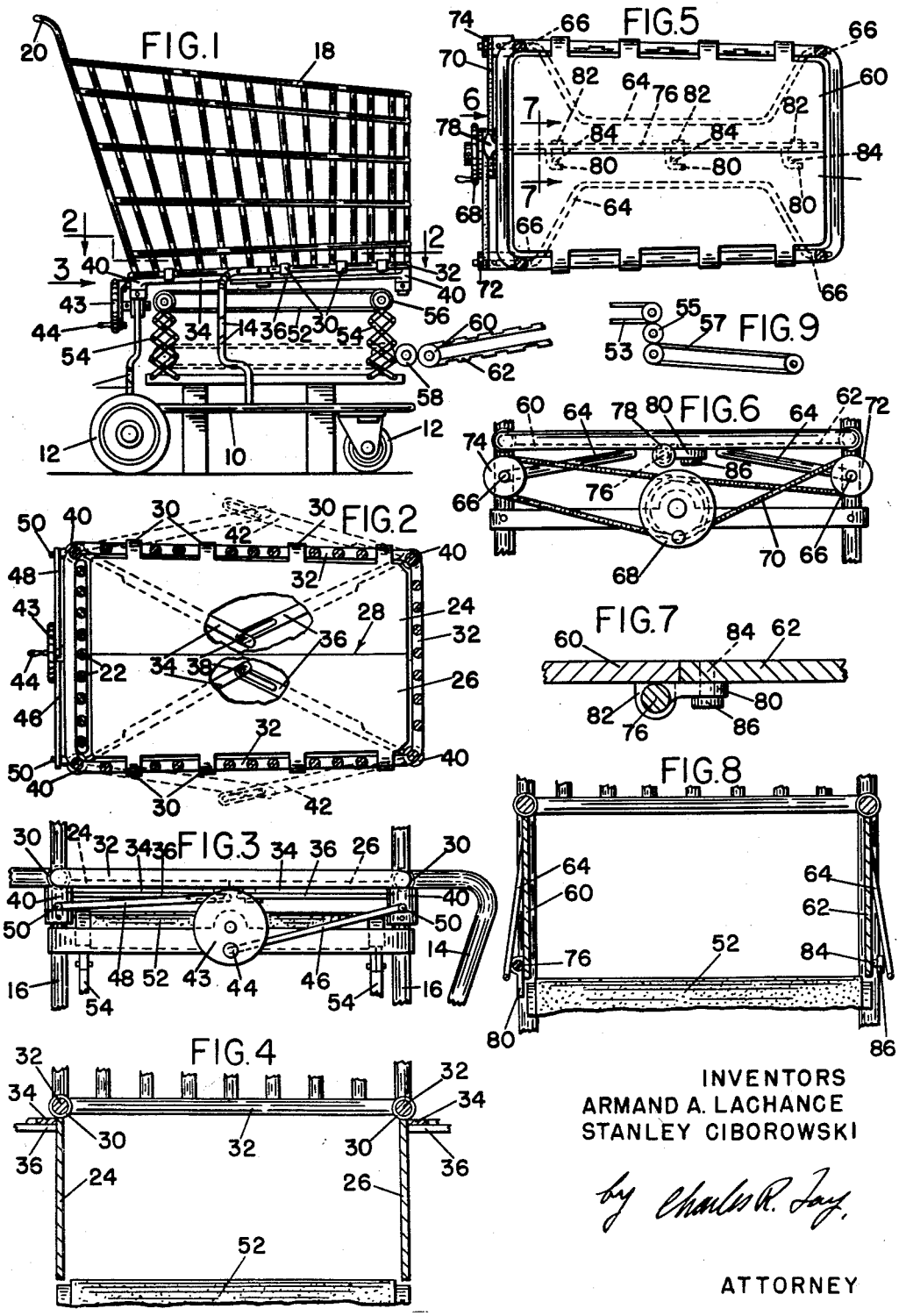
INVENTORS
ARMAND A. LACHANCE
STANLEY CIBOROWSKI
by Charles R. Fay
ATTORNEY United States Patent Office 3,112,832
Patented Dec. 3, 1963

3,112,832
AUTOMATICALLY ACTUATED GROCERY CART
Armand A. Lachance, North Oxford, and Stanley Ciborowski, Worcester, Mass.; said Ciborowski assignor to said Lachance
(Both % American Metal Products Co., Southbridge St., Auburn, Mass.)
Filed May 26, 1960, Ser. No. 31,917
3 Claims. (Cl. 214—46)

This invention relates to a new and improved grocery cart which is provided with means for automatically depositing the contents therefrom whereby the contents may be automatically carried to an accounting station and thereafter may be packed for the customer to take from the store, with the particular view to speeding the waiting lines of customers as they pass the charge-out desk at super markets.

Other objects of the invention include the provision of a grocery cart having the usual rear swinging gate for nesting purposes and also being provided with a swinging bottom member or members having means normally holding the same in position so that the customer may fill the cart with groceries but when reaching a certain predetermined location, a latch or similar means is released, allowing the bottom of the grocery cart to gradually open and deposit the contents thereof in a location where the same may be quickly and easily transferred to an accounting station; the provision of a grocery cart as above described including means for returning the open bottom members of the cart to closed position for further use of the cart in its intended way, and also including a conveyor which is mounted in a stationary location but which receives the groceries as they are deposited upon the opening of the bottom member of the grocery cart, said conveyor being operated to carry the groceries to an intermediate conveyor which will transport the groceries as aforesaid to or past the charge-out counter.

Further objects of the invention include the provision of a conveyor mounted in a fixed location and which is adapted to be received under the bottom of the grocery cart when the same is brought to the predetermined location, together with means raising the conveyor to a position adjacent the bottom of the cart, in combination with means allowing the bottom of the cart to open to spread or deposit the cart's contents on the conveyor, and means providing for retraction downwardly of said conveyor as the cart bottom opens, so that the goods in the cart will not tend to fall off the sides of the conveyor but will be held in position by the descending sides of the cart, so that the groceries may be led off to the desired location.

The invention further relates to arrangements and combinations of parts which will be hereinafter described and more particularly set forth in the appended claims.

Reference is to be had to the accompanying drawings, in which

FIG. 1 is a view in elevation of a grocery cart according to the present invention;

FIG. 2 is a section on line 2—2 of FIG. 1 on an enlarged scale;

FIG. 3 is a view in elevation illustrating details of the device, looking in the direction of arrow 3 in FIG. 1;

FIG. 4 is a cross sectional view taken transversely of the cart and showing the bottom members open;

FIG. 5 is a plan view of a modification of the cart illustrating a catch for holding the bottom members of the cart;

FIG. 6 is a view on an enlarged scale, looking in the direction of arrow 6 in FIG. 5;

FIG. 7 is an enlarged section on line 7—7 of FIG. 6;

FIG. 8 shows the apparatus of FIGS. 5 and 6 with the bottom doors of the cart in open condition, and FIG. 9 is a diagram showing a different arrangement of the conveyors.

In carrying out the present invention, the same may be applied to a grocery cart of any desired description. In the case illustrated, this cart comprises a lower platform 10 which may be of any description and mounted on it there are wheels 12, 12 which may also be of any kind. On the frame 10 there are uprights 14 and 16 as may be necessary to hold and support the wire basket 18 more or less as usual free of and spaced from the platform 10. There is a pusher handle at 20 and also there is a swinging rear gate more or less as usual and indicated at 22. This swinging gate is well known in the art and serves to allow the carts to be nested.

The particular cart of the present invention is provided with two floor members and these are indicated at 24 and 26, see particularly FIG. 2. These floor members may be solid or preferably they are made of wire, and support the groceries within the basket 18. Any types or combinations of such doors can be used as long as they open to permit passage of the cart contents.

These two floor members are adapted to separate upon a median line 28 and may be hinged in any way desired along the outer edges thereof as by hinges of any kind such as those shown at 30, 30 which may be conveniently mounted on an outside wire member 32 or in any other way. The two pivoted floor members 24 and 26 must be supported in closed relationship in which the edges more or less abut at 28 to hold the merchandise in the cart. This may be done by any desired or convenient method, but as shown in FIGS. 2 and 3, two pairs of links indicated at 34 and 36 and having a pin-and-slot connection 38 may be pivotally mounted at the corners of the cart as at 40, 40. Mounted on vertical axes, these members swing in a horizontal plane as indicated by the outboard positions thereof as indicated in dotted lines in FIG. 2 at 42. When moving from the inner to the outer positions these links allow the floor members 24 and 26 to open as shown in FIG. 4, but when the links 34 and 36 are swung backwards (in their horizontal plane), they not only move the floor members 24 and 26 to the closed position thereof, but hold them closed.

In order to actuate these links 34 and 36, any desired or convenient means can be used; but as illustrated, a crank 43 may be utilized at the rear portion of the cart, this crank having a handle 44 (or being operated by power means) and having a couple of crank arms 46 and 48 which are respectively connected as at 50, 50 to extending end portions of the arms 34, 34. Thus it will be seen that by turning the crank 42 in an appropriate direction, the arms 34, 36 will be swung in-and-out according to the desires of the operator.

When the cart is full or the customer has purchased the desired quantity of goods, the cart is then moved to a predetermined location where the bottom of the cart basket overlies the conveyor construction best shown in FIG. 1. This conveyor is indicated at 52 and it is enterable between the container or basket bottom and the platform 10. The conveyor is in a fixed location but is capable of up-and-down motion and may be supported on spring-pressed lazy-tongs 54 or in any other desired or convenient way. Any means may be provided for causing the conveyor 52 to move up and down as for instance springs or even electrically operated solenoids, etc., but in any event when the cart is in position to deposit the contents thereof, the conveyor 52 is in the uppermost solid line position as shown in FIG. 1 directly under the floor parts 24 and 26. When these floors are released as above described, or in any other way, and they start to open, they rest upon the top run of the conveyor 52 which is at that time stationary and not running. As the doors open and the contents descend upon the belt 52, the latter lowers to the full open condition of the door members 24 and 26 and these act as side guards preventing any of the merchandise from falling off the lateral edges of the conveyor belt 52. A rear stop member can also be provided if needed.

As the conveyor descends, it allows the doors 24 and 26 to open to their full extent, or substantially to their full extent, as shown in FIG. 4, and when the conveyor 52 reaches its lowermost dotted line position as shown in FIG. 1, the forward portion thereof which is indicated at 56 strikes a fixed position idle roll 58 which is being turned by a roller 60 driven through another conveyor 62. Conveyor 62 is stationary but power driven and it actuates the belt 52 to move in the desired direction to transfer all of the goods onto the belt 62. Belt 62 then takes such goods upwardly to the accounting station where either an operator or automatic means may be used to add the total to be paid by the customer. Preferably conveyor belt 62 is provided with teeth to prevent roll-back of any of the goods received therefrom from the conveyor 52.

Also, referring to FIG. 9, belt 53, similar to that at 52, may have an idle roll 55 just beneath the exit end thereof, so that the reverse travel of the idler surface will not interfere with the free flow of the goods. Then the carry-off conveyor 57, similar to that at 62, may contact the under side of the idler, for the same reason, and may slant down instead of up to facilitate the movement of the goods.

When the goods have been deposited upon the conveyor 62, the operator may actuate the crank 42 in order to bring inwardly arms 34 and 36 to close doors 24 and 26, and the cart may then be removed from the vicinity of the conveyors and nested for further use by the customers.

The legs 14 may be made to extend somewhat outwardly if desired in order to accommodate the members 34 and 36 if this should be found to be necessary.

FIGS. 5 to 9 show a modification of the device in which the merchandise conveying means may be generally the same as before but in this case the floor members 60 and 62 are moved upwardly to closed horizontal position by members 64 pivoted on horizontal axes at 66.

The members at 64 act in the nature of crank arms and again can be operated by a form of crank or the like 68 which may be hand or power operated as desired, see belt 70 running about pulleys 72 and 74.

Also an additional latch may be utilized to hold the floor members firmly shut and this comprises an elongated rod 76 which extends from end-to-end substantially of the cart and may be operated by the operator by the customer by knob 78. The rod can move forwardly and rearwardly and has mounted upon it a series of hook-like members 80. The rod 76 is mounted in brackets 82 on one floor member 60 and the other floor member 62 is provided with pins 84 having heads 86 at the lower ends thereof so that the hooks 80 can engage the pins and hold the floor parts 60 and 62 fully closed.

It is pointed out that the construction shown and described may be varied a considerable extent without departing from the scope of the invention. The floor need not be made in two parts but could be made in one swinging part, or it could be divided transversely so that each floor part is mounted upon an end portion of the cart. Other variations could also be made, and any means may be utilized for actuating the moving parts, whether by hand operated means, gravity, spring means, or power-operated devices. All of these things would come within the skill of a competent mechanic and the use thereof does not depart from the scope of the invention.

This invention provides a means for automatically depositing the goods in the basket to a central accounting location or charge-out desk, and this results in a great deal of speed-up of the work done at the charge-out desk for servicing more customers per period of time than is possible at the present time with the usual cart wherein the customer has to remove separately each of the articles out of the basket and place them on the charge-out counter.

Having thus described our invention and the advantages thereof, we do not wish to be limited to the details herein disclosed, otherwise than as set forth in the claims, but what we claim is:

1. The combination of a grocery cart with grocery transporting mechanism wherein the cart is hand manipulated and comprises an enclosure, a floor on the cart for said enclosure, said floor being capable of being opened to discharge the groceries by gravity, means holding the floor normally closed, means for retracting said floor-holding means to allow the floor to open, said grocery transporting mechanism being relatively stationary and including means above which the cart is positioned to receive and convey grocery articles from said cart and deposited through an opening normally occupied by the closed floor to be transported from the cart to a desired predetermined location for checking, said last-named means comprising a conveyor, means to drive said conveyor so that the goods will drop upon the conveyor and be moved away from the area of the cart, and a second conveyor operatively associated with the first conveyor to receive the goods and transport the same, the first conveyor being of a size and shape to accommodate the bottom of the cart, said first-named conveyor including means for raising and lowering the same, the floor of the cart providing against escape of the goods laterally at the sides of the first-named conveyor, and said first-named conveyor acting in cooperation with the floor as it opens as a combined receptacle for the goods until such time as the second-named conveyor causes the first-named conveyor to be actuated to travel the goods from the first conveyor to the second conveyor.

2. In a grocery store, the combination of a stationary check-out station for the grocery articles, a hand-manipulated grocery cart comprising a wheeled frame, a basket mounted on said wheeled frame in vertically spaced relation thereto, a conveyor mounted in a substantially fixed position and adapted to be received between the frame and the basket, means providing for a vertical motion of said conveyor, a bottom for said basket, said bottom being openable to deposit the articles in the basket onto the conveyor, a latch for the bottom to hold it closed, means actuating the latch, said conveyor descending as the bottom of the basket is opened, means for actuating said conevyor to transport the goods out from under the basket, the means for actuating the conveyor including a second conveyor positioned to operate the first conveyor in the lowermost position of the latter, the check-out station being positioned to receive the grocery articles from the second conveyor.

3. In a grocery store, the combination of a check-out station for grocery articles, a hand-manipulated grocery cart in which the customer transports the articles, said cart comprising a wheeled frame, a basket mounted on and above said wheeled frame, in spaced relation thereto, with a conveyor mounted in substantially fixed position and adapted for reception vertically between the frame and the basket of the cart, said basket having a bottom, said bottom being openable to deposit the grocery articles onto the conveyor, means for holding the bottom of the basket closed, means actuating the conveyor to transport the goods out from under the basket, and means for further transporting the goods through the check-out station, the check-out station being relatively positioned with respect to the conveyor to receive the grocery articles.

References Cited in the file of this patent

UNITED STATES PATENTS

| | | |
|---|---|---|
| 1,177,353 | Pratt | Mar. 28, 1916 |
| 2,651,087 | Fellows | Sept. 8, 1953 |
| 3,036,722 | Sharaway | May 29, 1962 |